United States Patent
Winchester et al.

(10) Patent No.: US 6,200,482 B1
(45) Date of Patent: Mar. 13, 2001

(54) ARSENIC FILTERING MEDIA

(75) Inventors: Eric L. Winchester, Fredericton; Ronald C. Berry, Nasonworth; Michael J. McMullin, New Maryland, all of (CA)

(73) Assignee: ADI International Inc., Fredericton (CA)

( * ) Notice: Subject to any disclaimer, the term of this patent is extended or adjusted under 35 U.S.C. 154(b) by 0 days.

(21) Appl. No.: 09/407,708

(22) Filed: Sep. 28, 1999

Related U.S. Application Data

(63) Continuation-in-part of application No. 08/909,819, filed on Aug. 12, 1997, now abandoned.

(51) Int. Cl.$^7$ ............................................. C02F 1/28
(52) U.S. Cl. ...................... 210/681; 210/502.1; 210/911; 502/406
(58) Field of Search ................ 210/502.1, 506, 210/681, 911; 502/406

(56) References Cited

U.S. PATENT DOCUMENTS 5,122,112 * 6/1992 Jones ..................................... 210/691
5,512,491 * 4/1996 Mehkeri et al. ..................... 210/692

FOREIGN PATENT DOCUMENTS 1067627    12/1979  (CA) .

* cited by examiner

Primary Examiner—Ivars Cintins
(74) Attorney, Agent, or Firm—Palmer C. DeMeo; Mario D. Theriault

(57) ABSTRACT

Arsenic filtering media consisting essentially of calcined diatomite particles, and between 5% and 30% by weight of ferric ions bonded to the calcined diatomite particles. One method for producing the filtering media consists of: generating a mixture of calcined diatomite particles and ferric chloride; allowing the mixture to sit for an extended period, thereby allowing ferric chloride to thoroughly impregnate the diatomite particles; and slowly adding sodium hydroxide to the mixture until the pH of the mixture reaches a value of at least 9.0, for ensuring unhasty and full conversion of ferric chloride into ferric hydroxide. The filtering media thus obtained have strong and durable bonds between ferric ions and the diatomite particles. The filtering media are renewable several times with minimum reduction to their arsenic adsorption capacity. A method for renewing the filtering media comprises in-situ desorption of arsenic using sodium hydroxide and rinsing with water.

2 Claims, 3 Drawing Sheets

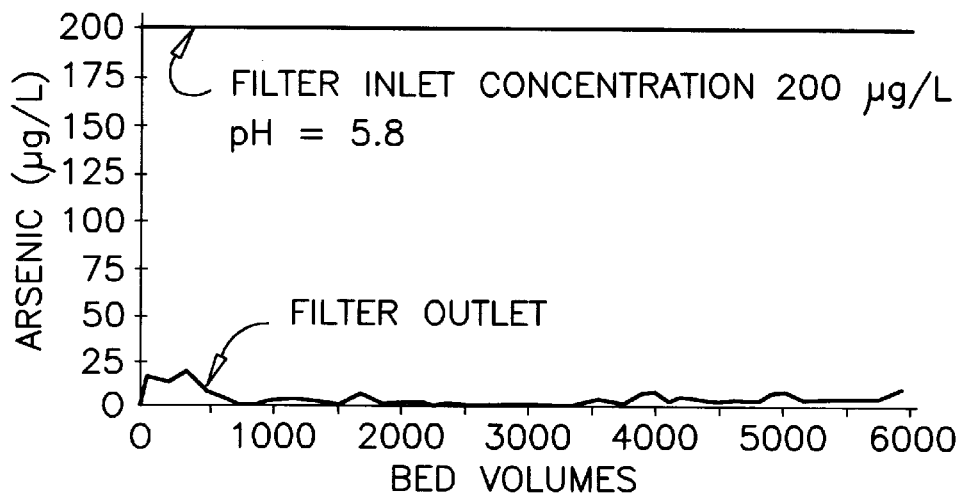
FIG. 1 ARSENIC REMOVAL – ACTIVATED ALUMINA
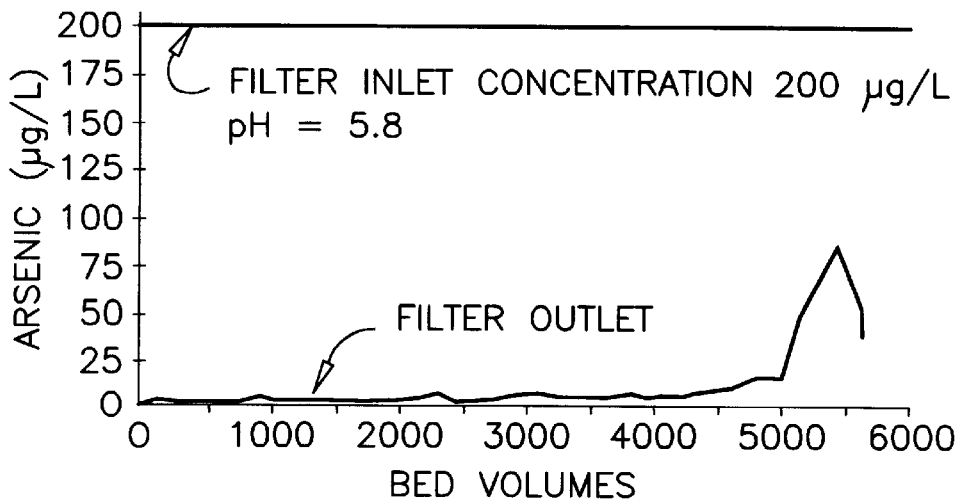
FIG. 2 ARSENIC REMOVAL – MEDIA G2
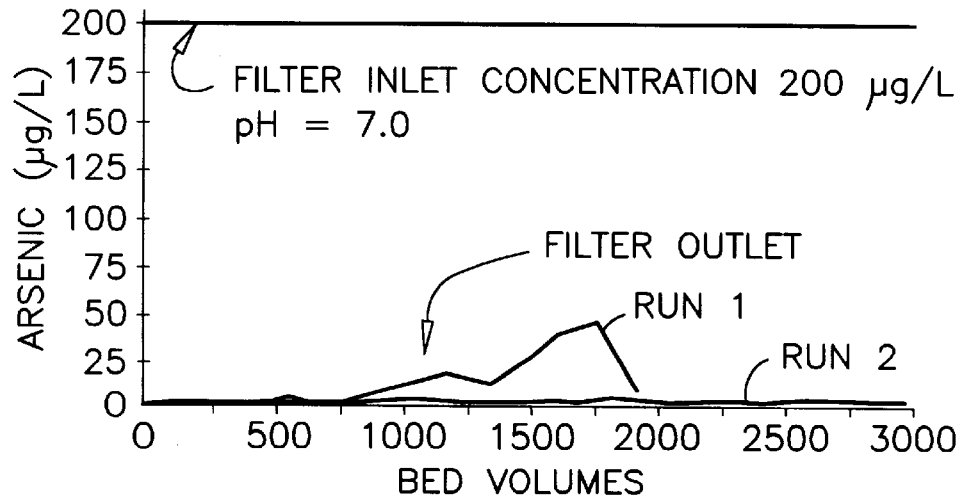
FIG. 3 ARSENIC REMOVAL – MEDIA G2

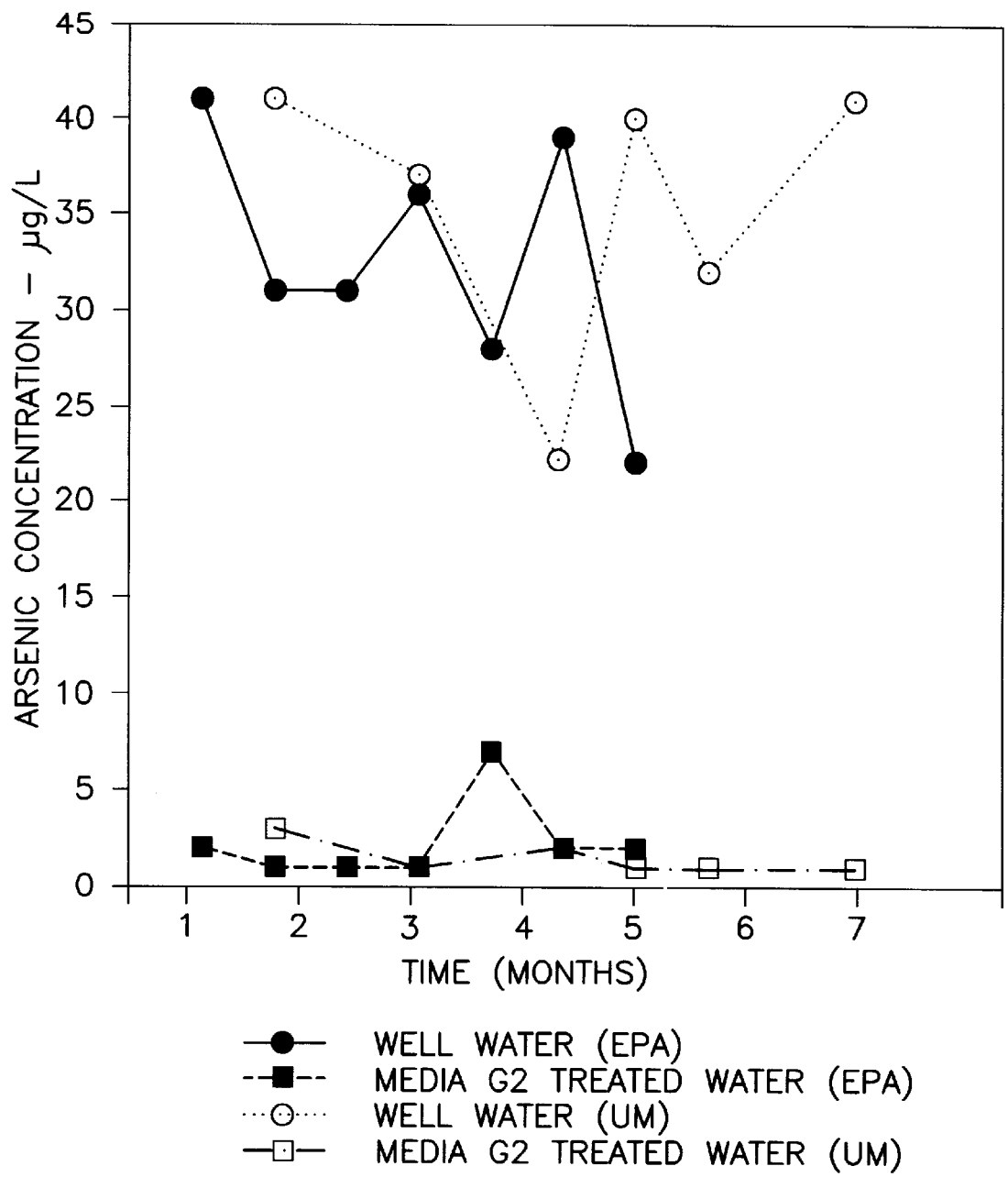
FIG. 4 RHC ARSENIC REMOVAL PLANT ARSENIC REMOVAL

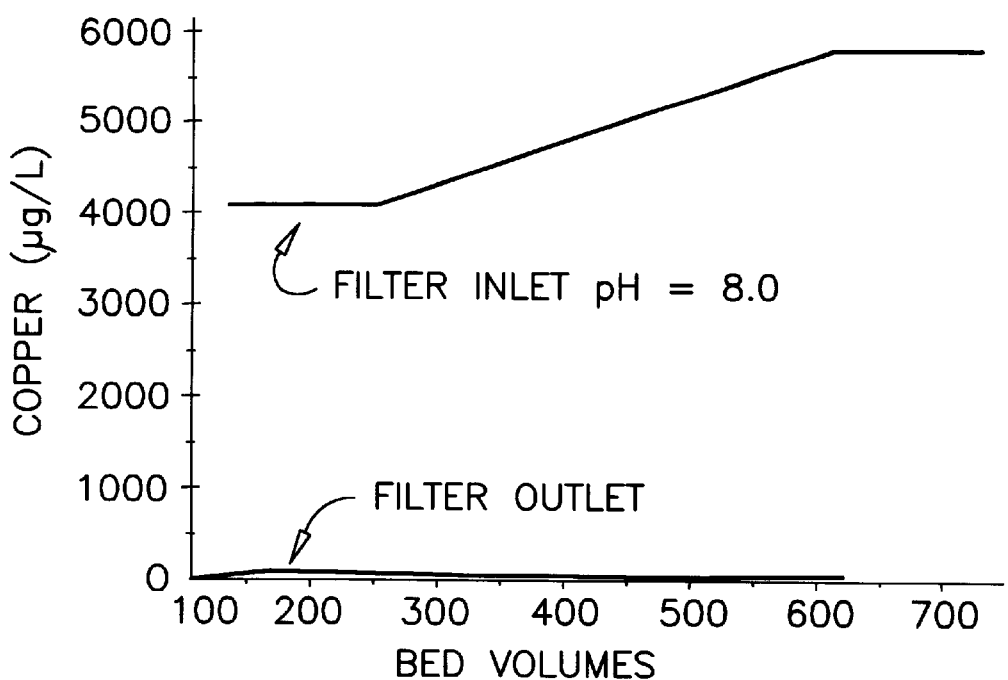
FIG. 5 COPPER REMOVAL - MEDIA G2
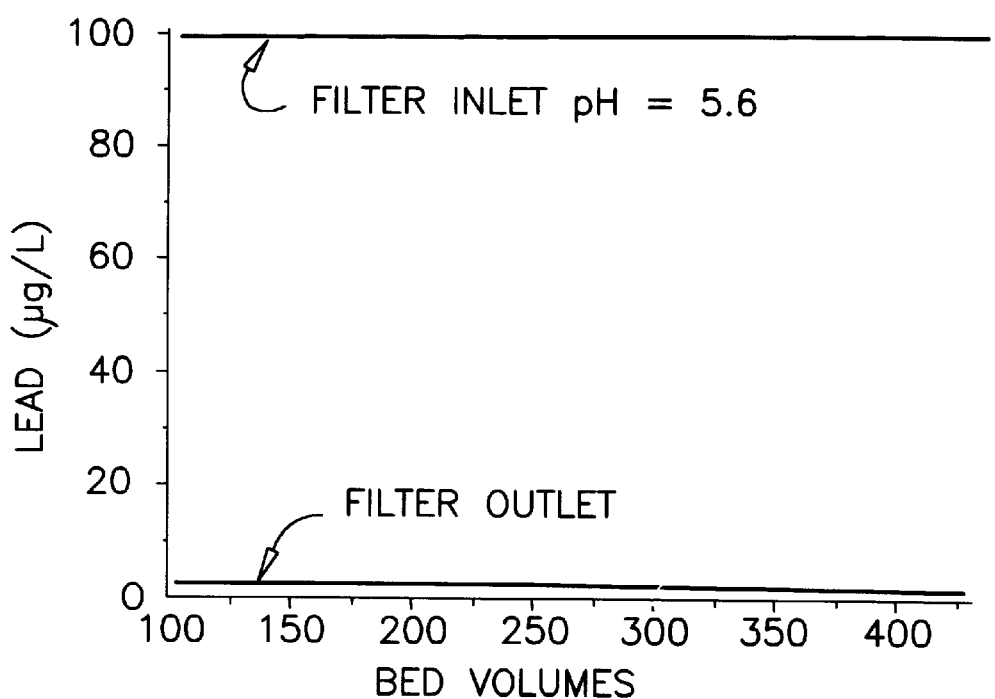
FIG. 6 LEAD REMOVAL - MEDIA G2

ARSENIC FILTERING MEDIA

This is a continuation-in-part of U.S. patent application Ser. No. 08/909,819, filed on Aug. 12, 1997, now abandoned.

FIELD OF THE INVENTION

The present invention relates to filtering media for removing arsenic from ground water, and more particularly, the present invention relates to arsenic filtering media that are renewable and that are efficiently usable for filtering water at common drinking-water pHs.

BACKGROUND OF THE INVENTION

Arsenic is a naturally-occurring element found in ground and surface water, and is present in high concentrations in many parts of the world. Also, there are many locations where ground water has been contaminated with arsenic from industrial activities such as mining operations, waste pile run off and pesticide manufacturing.

It has long been known that arsenic is a highly toxic substance, a suspected carcinogen, and can be deadly in pure form. The long-term effects of consuming water with naturally occurring high levels of arsenic have been the subject of numerous studies. It has been found that the so-called chronic arsenic poisoning can cause thickening and discolouration of the skin, cancers of the liver, kidney and skin, and loss of circulation in the extremities causing a gangrenous-like condition known as blackfoot disease.

Due to the toxic and carcinogenic nature of arsenic, government agencies have established a maximum acceptable concentration of allowable arsenic in drinking water. In Canada, Health and Welfare Canada has set a maximum acceptable concentration of 25 $\mu$g/L in drinking water. The World Health Organization has established a maximum acceptable concentration of 10 $\mu$g/L. Currently, the USA limit is 50 $\mu$g/L, but the USA's Environment Protection Agency is in the process of revising this limit downward, perhaps to a standard as low as 10 $\mu$g/L. It is known that several States have already reduced the limit to 10 $\mu$g/L.

Several methods have been used in the past for removing arsenic from water. Existing surface water treatment plants employing conventional treatment trains such as lime softening, and coagulation/flocculation/filtration have shown arsenic removal abilities as a side effect. Advanced technologies such as ion exchange, activated alumina, and membrane processes such as reverse osmosis, have had much less testing but have shown good potential under certain conditions. However, it has been demonstrated in previous research that the background water quality matrix strongly influences arsenic removal. For examples, alkalinity affects coagulation processes; sulfates affect ion exchange and membrane processes; activated alumina performance declines with increasing pH and fluoride concentration, and co-precipitation with iron is inhibited by high chloride concentration.

In addition to the possible presence of inhibitory substances in water, other difficulties associated with the removal of arsenic from ground water include high cost, complexity, and method of use. For examples, lime softening or coagulation/flocculation/filtration plants are expensive and they require a relatively high degree of operator attention. These plants are also known to create large quantities of residuals which can pose disposal problems. Activated alumina and ion exchange media are expensive to manufacture. Membrane filtration plants are also expensive to build, can be technically challenging to operate, and often result in wastage of over 50% of the water supply. In some cases it has been found that for every 100 litres entering the plant, often less than 50 litres of high-purity water is produced, with the remaining being wasted.

Recently, research has been carried out regarding the use of iron-oxide coated sand as filtering media. The iron-oxide coated sand has been shown to efficiently remove arsenic from ground water. However, this product has not been developed on a large scale, primarily due to the fact that the existing formulation requires a complex and expensive preparation including the baking of an iron-oxide coating onto the sand particles. To date, this preparation procedure has been limited to production of small quantities for laboratory experimentations.

Similar research has been carried out with respect to the use of iron-oxide impregnated porous support materials as filtration media. For example, Canadian Patent 1,067,627 issued to Gerald D. Lutwick on Dec. 4, 1979 teaches a method and apparatus for the removal of arsenic from water by passing water containing arsenic over a porous support material which is impregnated with ferric hydroxide. The Lutwick patent provides two examples of filtering materials for removing arsenic from ground water. In the first example the filtering material was impregnated with 4.4% ferric ions as $Fe(OH)_3$, and in the second example, the filtering material was impregnated with 0.97% ferric ions as $Fe(OH)_3$. The tests were carried out at a water pH of 4.7 in the first case, and with a water pH of 3.9 in the second case. The Lutwick patent further teaches that arsenic removal is preferably carried out with the water at an optimum pH of 4.4.

The Lutwick patent also teaches that in some applications, the filtering material may be regenerated. The Lutwick patent is silent with regard to a method of regeneration of the filtering material or whether regeneration involves re-impregnation with $Fe(OH)_3$.

As such, it will be appreciated that there continues to be a need for a filtering medium capable of use with well water as it comes out of the ground, without pH adjustment before or after the filtration process. There continues to be a need for a filtering medium from which arsenic can be desorbed and washed out, and the adsorption capacity of which can be restored to an effective level without having to re-impregnate ferric ions therein.

Further, it is believed that there continues to be a need for an arsenic filtering medium which is relatively inexpensive, effective over a wide range of water chemistry and capable of being used on residential wells as efficiently as in industrial, commercial and municipal installations.

SUMMARY OF THE INVENTION

The present invention provides for arsenic filtering media which have a large arsenic adsorption capacity, which are particularly efficient in removing arsenic from ground water at drinking-water pHs (6.5–8.0), and which can be easily and inexpensively mass-produced. More importantly, the filtering media of the present invention are renewable several times for re-use after becoming saturated with arsenic.

Broadly, in a first aspect of the present invention, there is provided an arsenic filtering medium consisting essentially of calcined diatomite particles and ferric ions bonded to the calcined diatomite particles, and which is produced by a method comprising the steps of: generating a mixture of calcined diatomite particles and ferric chloride; allowing the mixture to sit for 16 hours, thereby allowing ferric chloride to thoroughly impregnate the diatomite particles, and slowly adding sodium hydroxide to the mixture until the pH of the mixture reaches a value of at least 9.0, for ensuring unhasty and full conversion of ferric chloride into ferric hydroxide.

The filtering medium thus obtained has strong and durable bonds between ferric ions and the diatomite particles. The filtering medium according to this aspect of the invention is renewable several times with minimum reduction to its arsenic adsorption capacity. Tests have shown that a reduction in the arsenic adsorption capacity of the filtering medium is limited to less than 10% each time the filtering medium is renewed.

Another characteristic of the filtering medium according to the present invention is that arsenic is securely bonded to the filtering medium to prevent leaching of arsenic downstream of a filter containing the filtering medium saturated with arsenic.

It is believed that the advantageous features mentioned above are obtained primarily from the strong and durable bonds generated during the preparation of the filtering medium, between the ferric ions and the diatomite particles.

It is also believed that the particularly high loading of ferric ions onto the diatomite support material obtained by such preparation method is another factor contributing to some degrees to the performance of the filtering medium.

As such, in accordance with another aspect of the present invention, the step of generating a mixture of calcined diatomite particles and ferric chloride in the above method comprises the step of adding 4 ml of 2.1 M $FeCl_3 \cdot 6H_2O$ solution per gram of calcined diatomite having particles ranging in sizes from 30 mesh to about 60 mesh, and the sodium hydroxide used in the step of slowly adding sodium hydroxide to the mixture has a concentration of 10 N. These additional limitations to the method for preparing the filtering medium according to the present invention are advantageous for providing a filtering medium that has ferric ions bonded to the diatomite particles in a proportion of as much as 1.36 grams of ferric hydroxide for each gram of diatomite particles. That is, for providing a filtering medium having ferric ions therein in a proportion of as much as 30% by weight.

The filtering medium according to this aspect of the present invention is particularly appreciable for having an arsenic adsorption capacity of about 1200 $\mu g/g$, an efficient utilization with water at drinking-water pHs and a renewability which is repeatable several times. The filtering medium according to the present invention has also been found efficient in the removal of other metals present with arsenic in the water to be filtered. In tests, the filtering medium according to the present invention has provided for over 99% removal of copper, 98% removal of lead and over 98% removal of uranium. It also has been observed in many cases that the filtering medium has the ability to remove iron from water. Further, the filtering medium according to this aspect of the present invention has shown no reduction in arsenic filtering efficiency with water containing up to 250 mg/L of chloride or sulphate.

Although such high loading of ferric ions into the diatomite material is preferable in most arsenic filtering installations, lighter loadings of ferric ions have nonetheless shown advantageous results and may be preferred for use in less demanding applications for example. Therefore, in accordance with a further aspect of the present invention, there are provided arsenic filtering media consisting essentially of calcined diatomite particles ranging in size from 30 mesh to 60 mesh, and between 5% and 30% by weight of ferric ions bonded to the calcined diatomite particles. The arsenic filtering media according to this aspect of the present invention are usable for filtering water at drinking-water pHs and a restoration thereof is repeatable several times.

In accordance with yet another aspect of the present invention, there is provided a method for renewing arsenic filtering media containing calcined diatomite particles and ferric ions bonded to the calcined diatomite particles, and being saturated with arsenic. This method comprises the steps of slowly passing sodium hydroxide at a concentration of between 0.5N to 2.0N downward through the arsenic filtering media. The abrasion of the arsenic filtering media is thereby reduced and a performance thereof is substantively maintained. It has been found that this method is efficient for desorbing at least about 82% of the arsenic from the arsenic filtering media while retaining about 90% arsenic adsorbing capacity of the arsenic filtering media. This method of renewing filtering media has been found advantageous for not requiring a chemical regeneration of the media such as desorbing arsenic therefrom and re-impregnating ferric ions into the support material.

Still another feature of the invention is that the filtering media are susceptible of a low cost of manufacture with regard to materials, equipment and labour, and which accordingly are then susceptible of low price of sale to the industry, thereby making such arsenic filtering media economically available to the public.

Of considerable importance, the filtering media according to the present invention have been certified for use in drinking water applications by USA's National Sanitation Foundation (NSF International), under the ANSI/NSF Standard 61 entitled: Drinking Water System Components—Health Effects.

Other advantages and novel features of the invention will become apparent from the following detailed description.

BRIEF DESCRIPTION OF THE DRAWINGS

A preferred embodiment of the present invention selected by way of examples will now be described with reference to the accompanying drawings in which:

FIG. 1 illustrates arsenic concentration in the inlet and outlet flows to and from a bench-scale filtering column containing activated alumina;

FIG. 2 illustrates arsenic concentration in the inlet and outlet flows to and from a bench-scale column filter containing a filtering medium according to the present invention;

FIG. 3 illustrates arsenic concentration in the inlet and outlet flows to and from a pilot filter containing a filtering medium according to the present invention;

FIG. 4 illustrates arsenic concentration in the inlet and outlet flows to and from a commercial filtering installation containing a filtering medium according to the present invention;

FIG. 5 illustrates copper removal from water at water pH 8.0 using the filtering medium according to the present invention in a pilot filter installation.

FIG. 6 illustrates lead removal from water at water pH 5.6 using the filtering medium according to the present invention in a pilot filter installation;

DETAILED DESCRIPTION OF THE PREFERRED EMBODIMENT

While this invention is susceptible of embodiments in many various forms, there will be described in details herein a specific embodiment, with the understanding that the present disclosure is to be considered as an example of the principles of the invention and is not intended to limit the invention to the embodiment illustrated.

A number a different filtering media were prepared and tested, including some of the prior art media. However, for the clarity of the text, only the test results for the filtering media according to the preferred embodiment are included herein. In order to provide comparative measures, the test results are compared to the results obtained with activated alumina, which is believed to be the most common arsenic adsorptive medium in use today. Also, for the clarity of the text, the filtering media according to the preferred embodiment are referred to herein as the Medium G2, or Media G2™.

The term Media G2 is used herein to indicate a filtering medium according to the preferred embodiment and any possible variations to the content and structure of this filtering medium, wherein the variations are included within the ranges specified herein.

Preparation of the Activated Alumina

For reference purposes, the activated alumina media used in the tests mentioned herein below were prepared from a standard 14 mesh material, rinsed with tap water.

Preparation of the Media G2

The preferred support material for preparing the Media G2 is calcined diatomite having particles ranging in size from about 30 mesh (0.85 mm) to about 60 mesh (0.42 mm). This support material is available from Eagle-Picher Minerals Inc., a company from Reno, Nev., USA, under the designation MP 79.

The calcined diatomite was coated with 4 mL of 2.1 M $FeCl_3 \cdot 6H_2O$ solution per gram of diatomite. The solution was mixed into the diatomite for 30 minutes using an end-over-end stirring apparatus running at 60 rpm. The resulting slurry was then allowed to sit for 16 hours so that the ferric chloride could soak into the diatomite particles. After soaking, all excess solution was poured off of the media material and enough tapwater was added to just submerge all of the media material. Then, 10 N NaOH was slowly added over a 10 to 15 minute period to slowly bring the pH of the slurry from about 1 up to a final value of about 9. Finally, the media material was rinsed with tap water to remove excess ferric hydroxide not bonded to the media particles. Rinsing was stopped when the concentration of Fe was less than 0.1 mg/L in the outlet rinsing water.

The Media G2 were prepared in batches, wherein each batch contained about 75 grams of calcined diatomite. Therefore, the mixing, settling or reaction time periods specified above may be adjusted accordingly with other batch sizes.

This method has been found particularly efficient in loading as much ferric ions into the media as possible. It has been found that the resulting filtering Media G2 contain as much as 1.36 grams of ferric hydroxide adsorbed and bonded by ionic bonds to each gram of calcined diatomite. In another form of expression, the Media G2 contain as much as 0.71 g of ferric ions per gram of diatomite material, or 30% by weight of ferric ions.

This particularly high loading of ferric ions to the calcined diatomite is believed to be an important contributing factor in obtaining the results and advantageous characteristics of the filtering Media G2 as explained herein. Although this particularly high loading of ferric ions into the media particles is believed to be a contributing factor for obtaining arsenic filtering media that have great adsorption capacities, which are efficient at drinking-water pH (6.5–8.0), and which are renewable several times, it is believed that such high content of ferric ions is preferable but not absolutely required for obtaining to a certain extent at least some of the aforementioned characteristics.

Further testings following the testing program described herein have indicated that the strong and durable bonds generated during the preparation of the Media G2, between the ferric ions and diatomite, and the renewability feature associated therewith were found in some Media G2 containing as low as 5% by weight of ferric ions. An efficient use at drinking-water pHs was also found in some Media G2 containing about 5% by weight of ferric ions. Therefore, it is believed that the nature of the bonds obtained during the preparation of the Media G2 by the above method, between ferric ions and the diatomite support material, is as important as the concentration of ferric ions in the diatomite support material, for obtaining arsenic filtering media which are renewable several times and which are efficient at drinking-water pHs.

EXAMPLE 1

Bench-Scale Column Tests

Each column test was carried out using a filter comprising two 15 mm diameter, 150 mm long plastic columns connected in series. A nominal quantity of 25 ml. (20 g) of filtering Medium G2 was placed into each of the columns, for a total of 50 mL of medium per filter. Tap water spiked with 200 µg/L arsenic was pumped to each filter at a rate of 5 mL/min. using a metering pump. The empty bed contact time was therefore 5 minutes through the first column and 10 minutes through both columns. Samples were collected at regular time intervals from sample points located after the first and second columns.

Results of these tests are shown in FIGS. 1 and 2. As can be appreciated the Medium G2 provided outstanding results, treating over 5000 bed volumes before the outlet concentration exceeded 25 µg/L. Medium G2 was still producing 2 µg/L arsenic content until up to 4000 bed volumes. This performance was similar to that of activated alumina, with both providing an arsenic adsorption capacity of over 1200 µg/g.

Samples of the treated water from the column tests as described above were subjected to a comprehensive metals scan and general chemistry analysis. Typical results are presented in the following Tables 1 and 2. As can be seen in these tables, the Media G2 did not alter the water quality in any negative way. Media G2, in addition to removing arsenic, also provided 80% to 90% removal of copper and 98% to 99% removal of lead. As a comparison, activated alumina provided 62% removal of copper and 70% removal of lead. Further studies, as discussed below, provided results to substantiate the ability of Media G2 to remove copper and lead.

TABLE 1

Metal Analyses for Bench-Scale Column Tests

Concentration (μg/L)

|  | Raw | Activ. Alumina | Media G2 |
|---|---|---|---|
| Aluminum | 12 | 12 | 9 |
| Antimony | 0.1 | <0.1 | 0.8 |
| Arsenic | 177 | 2 | <1 |
| Barium | 129 | 112 | 115 |
| Boron | 23 | 24 | 26 |
| Calcium | 9550 | 9210 | 9750 |
| Cobalt | <0.1 | 0.2 | 0.4 |
| Copper | 890 | 340 | 196 |
| Iron | 30 | <20 | 20 |
| Lead | 37.1 | 11.1 | 0.8 |
| Lithium | 1 | 1.2 | 1.1 |
| Magnesium | 2040 | 1930 | 2060 |
| Manganese | 8 | 6 | 6 |
| Nickel | 5 | 4 | 5 |
| Potassium | 750 | 850 | 740 |
| Sodium | 5930 | 5880 | 5600 |
| Strontium | 54 | 56 | 58 |
| Tin | 1.3 | 0.9 | 0.4 |
| Zinc | 110 | 66 | 110 |

TABLE 2

General Chemistry Analyses, Bench-Scale Column Tests

Concentration (mg/L)

|  | Raw | Activ. Alumina | Media G2 |
|---|---|---|---|
| Ammonia (as N) | <0.05 | <0.05 | <0.05 |
| Alkalinity (as $CaCO_3$) | 15 | 13 | 14 |
| Chloride | 12.5 | 12.6 | 12.6 |
| Sulfate | 7.7 | 8.8 | 7.9 |
| $NO_3 + NO_2$ (as N) | 1.88 | 1.87 | 1.88 |
| o-Phosphate (as P) | 0.05 | <0.01 | <0.01 |
| r-Silica (as $SiO_2$) | 10.8 | 9.6 | 11.3 |
| Total Organic Carbon | <1 | 1 | 1 |
| Turbidity (NTU) | 0.2 | 0.2 | 0.3 |
| Conductivity (μs/cm) | 104 | 99 | 103 |
| Hardness (as $CaCO_3$) | 32.2 | 30.9 | 32.8 |

EXAMPLE 2

Pilot-Scale Testing

A nominal quantity of 18.2 Litres (10 kg) of Medium G2 was placed in a pilot filter, which was operated on a continuous flow of 1.82 L/min, with a water pH of 7. The results using this filter are shown in FIG. 3. Breakthrough occurred after approximately 1500 bed volumes in a first run, as indicated by the curve labelled as RUN 1. Breakthrough is defined as when arsenic concentration at the filter outlet exceeds 25 μg/L. As can be appreciated, the results are inferior to those obtained during bench scale column testing described in Example 1. These differences are believed due to the water pH, which was 7.0, as compared to 5.8 for the bench scale column test.

After breakthrough, the Medium G2 was renewed in situ by passing a small volume of 2N NaOH through it, as will be explained later. The filter was put back on line and immediately produced water with an arsenic concentration below 2 μg/L. Interestingly, the performance of the Medium G2 after restoration, as shown as RUN 2 in FIG. 3, was much better than during the first run with the same water pH of 7.0. A possible explanation for this increase in performance is that the sodium hydroxide used in the restoration procedure may have effectively oxidized some ferric sites on the medium which were not oxidized during the original medium preparation procedure. During this second round of tests RUN 2, more than 2800 bed volumes were passed through the filter, and the outlet arsenic concentration in the outlet water remained less than 2 μg/L.

In addition to daily arsenic testing, a complete metal scan and general chemistry analyses were conducted on the pilot filter inlet and outlet water. Results are presented in Tables 3 and 4. The results presented in these tables demonstrate that, as with the bench-scale column filters, the water chemistry is not negatively impacted in any way by the Media G2 and that significant copper and lead removal is obtained; 94% and 84% respectively.

TABLE 3

Metal Analyses For Pilot-Filter Tests Using Media G2

Concentration (μg/L)

|  | Filter Inlet | Filter Outlet |
|---|---|---|
| Aluminum | 19 | 7 |
| Antimony | <0.1 | 0.3 |
| Arsenic | 203 | 12 |
| Barium | 125 | 4 |
| Boron | 35 | 32 |
| Calcium | 8370 | 14200 |
| Cobalt | 0.1 | 0.4 |
| Copper | 177 | 10 |
| Iron | <20 | <20 |
| Lead | 6.7 | 1.1 |
| Lithium | 1 | 0.8 |
| Magnesium | 1780 | 2960 |
| Manganese | 6 | 32 |
| Nickel | 1 | 2 |
| Potassium | 760 | 1060 |
| Sodium | 128000 | 105000 |
| Strontium | 44 | 88 |
| Tin | 0.3 | <0.1 |
| Zinc | 23 | 78 |

TABLE 4

Chemistry Analyses For Pilot-Filter Tests Using Media G2

Concentration (mg/L)

|  | Filter Inlet | Filter Outlet |
|---|---|---|
| Ammonia (as N) | <0.05 | <0.05 |
| Alkalinity (as $CaCO_3$) | 271 | 240 |
| Chloride | 10 | 10.2 |
| Sulfate | 8.9 | 10.9 |
| $NO_3 + NO_2$ (as N) | 1.58 | 1.54 |
| o-Phosphate (as P) | 0.11 | <0.02 |
| r-Silica (as $SiO_2$) | 10 | 10.7 |
| Total Organic Carbon | <1 | <1 |
| Turbidity (NTU) | <0.1 | 0.1 |
| Conductivity (μs/cm) | 521 | 496 |
| Hardness (as $CaCO_3$) | 28.2 | 47.6 |

EXAMPLE 3

Commercial Installation Testing

A filter containing Medium G2 was used to remove arsenic from the water supply to a commercial installation at Rose Hill Centre in Holly, Mich., USA. The inlet and outlet arsenic concentrations to and from the filter were monitored by USA's Environment Protection Agency (EPA), and by personnel from the University of Michigan (UM). The filter size was determined according to an expected duration of two years at a continuous water flow of 60 gal./min., and to an arsenic adsorption capacity of 1200 μg/g. Test results are available for a period of almost 6 months at the design flow rate, during which time, the Medium G2 has shown no sign of saturation nor no need for restoration. Test results for this commercial installation are shown in FIG. 4.

EXAMPLE 4

Effect of pH

Both the Media G2 and activated alumina were tested to determine their arsenic adsorption capacities at a water pH ranging from 6.0 to 8.0. Results are shown in Table 5 below.

TABLE 5

Effect of Water pH on Arsenic Adsorption Capacity

|  | pH range | Variation in Adsorption Capacity |
| --- | --- | --- |
| Activated Alumina | 6.0–8.0 | 58% |
| Media G2 | 6.0–8.0 | 34% |

As can be appreciated, performance of both media declined significantly as pH increased. However, Media G2 were more consistent over the pH range. The adsorption capacity of Media G2 declined by 34% as water pH was increased from 6.0 to 8.0 while activated alumina performance decreased by 58% over the same pH range.

EXAMPLE 5

Effect of Sulfate and Chloride

Two filters containing Media G2 were operated for three days, corresponding to 430 bed volumes, with a feed water containing 200 μg/L arsenic and either one of the following elements and proportions; (a) 500 mg/L sulfate; (b) 500 mg/L chloride; (c) 250 mg/L chloride, or (d) 250 mg/L sulfate. Outlet arsenic concentrations at the end of this period are shown in Table 6.

TABLE 6

Effect of Sulfate and Chloride on Media G2

| Inlet Water Contaminant (in addition to 200 μg/L As) | Outlet Arsenic Concentration (μg/L) |
| --- | --- |
| 500 mg/L Chloride | 11 |
| 500 mg/L Sulfate | 10 |
| 250 mg/L Chloride | <2 |
| 250 mg/L Sulfate | <2 |

At the 500 mg/L concentration, both chloride and sulfate had a noticeable effect, although outlet arsenic concentration was still only 10–11 μg/L after 430 bed volumes. At the 250 mg/L concentration, both chloride and sulfate had no effect. The 250 mg/L testing was then continued a further six days, for a total of 1150 bed volumes, and still no effect was observed.

EXAMPLE 6

Copper Removal

Testing of the Media G2 was carried out at a feed water pH of 5.6, with an inlet concentration of copper of 3580 mg/L. Removal of copper was 80% after one day of operation, but quickly declined to less than 50%. When the filter inlet pH was increased to 8.0, with inlet concentration of 5520 μ/L, the outlet concentration did not exceed 10 μg/L in over 600 bed volumes of operation. This represents a removal efficiency of 99.8%. This is illustrated in FIG. 5.

EXAMPLE 7

Lead Removal

Testing for lead removal was initially carried out at a feed water pH of 5.6, and filter inlet concentration of lead of 100 μg/L. Removal efficiencies were such that the filter outlet concentration did not exceed 3 μg/L, as shown in FIG. 6. Removal efficiencies declined markedly at pH 8.0, to as low as 50% after 750 bed volumes of flow.

Consequently, where the Media G2 are being used to remove copper, the filter inlet water pH should be adjusted to 8.0 whereas, water containing lead should be adjusted to pH 5.6. A preferred approach to the situation where both metals are present in the water to be treated, would include passing the water with a pH of 5.6 over the Medium G2 for removing lead first, followed by pH adjustment to a drinking water level, and effecting a second pass over the same medium or over a second bed of Medium G2 in series with the first one for removing copper.

EXAMPLE 8

Uranium Removal

Testing has also been carried out to remove uranium from water. The feed water pH was adjusted to 6.5, with a filter inlet concentration of uranium of 120 μg/L. Removal results provided an outlet concentration not exceeding 4 μg/L.

Media G2 Renewability

The terms renewable, renewability and restoration are used herein to explain the desorption and the rinsing off of the arsenic from a filtration medium, and the restoring or reviving of its filtration efficiency to a level which is approaching the new condition of the medium. The terms renewable, renewability and restoration are also used herein to differentiate from the word "regenerate" which implies according to an unabridged definition, to generate or produce anew. The filtering media according to the present invention are renewed without having to re-impregnate ferric ions therein.

Restoration of the Media G2 is preferably effected in situ by slowly passing NaOH downward through the media. The in situ restoration method is preferred to avoid the safety considerations and procedures associated with the manipulation of arsenic-saturated filtering media and for being more appropriate for realization in an automatic desorption and rinsing system. Renewing of arsenic-saturated Media G2 using 0.5 N, 1.0N, and 2.0N NaOH was carried out, and the percentage of arsenic recovered in each case was measured. Results are presented in Table 7.

TABLE 7

Restoration Efficiencies of Media G2

| NaOH Concentration | As Adsorbed Onto Media (µg) | As Desorbed by NaOH (µg) | % Desorbed |
|---|---|---|---|
| 0.5 N | 1996 | 1515 | 76% |
| 1.0 N | 2016 | 1662 | 82% |
| 2.0 N | 1970 | 1503 | 76% |

As can be appreciated, all three NaOH concentrations performed very similarly in terms of desorbing arsenic from the filtering media samples.

Media G2 were also tested for multiple restorations. Results of tests using multiple restorations of Media G2 and their uses in pilot filters are presented in Table 8. In this table, the renewability of Media G2 is compared to the renewability of activated alumina.

It has been found that between the first and fifth renewing cycles, Media G2's adsorption capacity decreased by 33%, while the performance of activated alumina decreased much more significantly, that is by 54%. This equals a reduction in performance of less than 10% per cycle for Media G2 and 18% per cycle for the activated alumina.

TABLE 8

Adsorption After Multiple Restorations

|  | After 1st Desorption | After 5th Desorption |
|---|---|---|
| Media G2 | 580 µg/g | 390 µg/g |
| Activated Alumina | 982 µg/g | 453 µg/g |

Accordingly, the restoration of the filtering efficiencies of Media G2 is achieved by using from at least as low as 0.5 N NaOH to at least as high 2.0 N NaOH. Slower decline in performance have been observed when the restoration is carried out in-situ using a circulation of sodium hydroxide and rinsing with water, wherein the sodium hydroxide was passed slowly downward through the filtering media.

Applicability of the Media G2 in the Industry

As may be appreciated, the Media G2 are simple to prepare and highly effective in removal of arsenic from water. In side-by-side column testing under identical conditions, they provided an arsenic removal capacity similar to that of activated alumina. A total of 5000 bed volumes of water containing 200 µg/L of arsenic was treated before the outlet concentration of the filter exceeded 25 µg/L. This is equivalent to an arsenic adsorption capacity of over 1200 µg/g of medium. With a 10 minutes of empty bed contact time, this means a continuous operation time of over 830 hours or 35 days before washing and restoration would be required.

Washing and restoration of a filter containing about 10 kg of filtering media for example, require approximately 2 hours, meaning a down time of only 0.2% and volume of waste production of about 0.1% of the treated water volume While the above-described tests used a very high raw water arsenic concentration of 200 µg/L, it is known that 95% of North American water supplies have less than 50 µg/L of arsenic. Run times between washing and restoration would theoretically be four times longer with such water.

In residential applications, a filtering cartridge as known in the art, containing the Medium G2 is preferably installed in a water supply system such that the flow of water through the filter is downward. The volume of the filter cartridge is preferably selected such that a water retention time through the Medium G2 is at least about 10 minutes. Desorbing, washing and restoration of the Medium G2 is preferably effected in-situ using piping systems, pumps and timers that are known to those skilled in the art of water softeners for example.

In the larger applications, the filtering Media G2 are preferably installed in filter beds or in large filter reservoirs as also known in the art. Again, the quantity of Media G2 and the size of the bed or tank are selected to provide a water retention time through the Media G2 of about 10 minutes.

As to additional details related to the manufacturing, installation and use of the filtering media of the present invention, the same should be apparent from the above description, and accordingly further discussion relative to the manner of making, using and renewing the Media G2 would be considered redundant and is not provided.

While one embodiment of the present invention has been described herein above, it will be appreciated by those skilled in the art that various modifications, alternate compositions, alternate methods and equivalents may be employed without departing from the true spirit and scope of the invention. Therefore, the above description and illustrations should not be construed as limiting the scope of the invention which is defined by the appended claims.

We claim:

1. An arsenic filtering medium for removing dissolved arsenic from water, consisting essentially of:

calcined diatomite, and between 5% and 30% by weight of ferric ions bonded to said calcined diatomite;

such that a restoration thereof after saturation with arsenic is repeatable several times.

2. A method for purifying water containing dissolved arsenic, comprising the step of:

passing water containing dissolved arsenic through a filtering medium consisting essentially of calcined diatomite and between 5% and 30% by weight of ferric ions bonded to said calcined diatomite;

such that an adsorption of arsenic by said filtering medium is effective at a drinking water pH and a restoration of said filtering medium after saturation with arsenic is repeatable several times.

* * * * *